(12) United States Patent
Jung (10) Patent No.: US 8,368,455 B2
(45) Date of Patent: Feb. 5, 2013

(54) APPARATUS AND METHOD FOR AUTOMATIC CONTROL OF CURRENT ELECTRODES FOR ELECTRICAL RESISTIVITY SURVEY

(75) Inventor: Hyun-Key Jung, Daejeon (KR)

(73) Assignee: Korea Institute of Geoscience & Mineral Resources, Daejon (KR)

( * ) Notice: Subject to any disclaimer, the term of this patent is extended or adjusted under 35 U.S.C. 154(b) by 0 days.

(21) Appl. No.: 12/280,432

(22) PCT Filed: Dec. 31, 2007

(86) PCT No.: PCT/KR2007/007024
§ 371 (c)(1),
(2), (4) Date: Aug. 22, 2008

(87) PCT Pub. No.: WO2009/084756
PCT Pub. Date: Jul. 9, 2009

(65) Prior Publication Data
US 2010/0256786 A1    Oct. 7, 2010

(51) Int. Cl.
*G05F 1/00*    (2006.01)
(52) U.S. Cl. ........................................ 327/518; 327/520
(58) Field of Classification Search .................. None
See application file for complete search history.

(56) References Cited

U.S. PATENT DOCUMENTS

| | | | |
|---|---|---|---|
| 5,606,275 A * | 2/1997 | Farhang et al. | 327/108 |
| 5,631,589 A * | 5/1997 | Afek et al. | 327/108 |
| 6,295,512 B1 | 9/2001 | Bryant | |
| 6,459,325 B1 * | 10/2002 | Hall et al. | 327/391 |
| 2003/0201802 A1 * | 10/2003 | Young | 327/108 |
| 2007/0299632 A1 | 12/2007 | Bryant | |

FOREIGN PATENT DOCUMENTS

| | | |
|---|---|---|
| KR | 20050063009 | 6/2005 |
| KR | 20060094444 | 8/2006 |
| KR | 100775601 | 11/2007 |

OTHER PUBLICATIONS

International Search Report for corresponding PCT Application No. PCT/KR2007/007024, dated Sep. 24, 2008.

\* cited by examiner

*Primary Examiner* — Cassandra Cox
(74) *Attorney, Agent, or Firm* — Caesar, Rivise, Bernstein, Cohen & Pokotilow, Ltd.

(57) ABSTRACT

An apparatus and method for automatic control of current electrodes in a measuring system for an electrical resistivity survey. An exemplary apparatus includes: a circuit where one pair of metal oxide semiconductor field effect transistors (MOSFETs) are connected to upper and lower terminals of n current electrodes and the one pair of MOSFETs are connected in parallel with each other; and a controller which controls ON/OFF of each MOSFET.
With this, the present invention provides a stable and semi-permanent apparatus for automatic control of current electrodes, which is capable of bipolar high-speed switching, and a method thereof.

8 Claims, 5 Drawing Sheets

APPARATUS AND METHOD FOR AUTOMATIC CONTROL OF CURRENT ELECTRODES FOR ELECTRICAL RESISTIVITY SURVEY

TECHNICAL FIELD

The present invention relates to an apparatus and a method for automatic control of current electrodes for an electrical resistivity survey, and more particularly to a stable and semipermanent apparatus for automatic control of current electrodes for an electrical resistivity survey, in which electronic devices of a metal oxide semiconductor field effect transistor (MOSFET) are employed in automatically controlling the current electrodes, and a method thereof.

BACKGROUND ART

Recently, an electrical resistivity survey has been widely used as one of geophysical surveys for non-destructively imaging a subsurface. The electrical resistivity survey is a geophysical method that artificially applies an electric current I to the subsurface so as to measure electric potential ΔV and then surveys a geological structure or an anomaly zone on the basis of difference in distribution of electrical and physical properties between subsurface mediums, thereby imaging a stratum structure formed with a non-uniform and complicated medium.

In other words, while a direct current flows alternately between forward and backward through a pair of electrodes, the electric potential is measured in another pair of potential electrodes, thereby surveying distribution of subsurface electrical resistivity.

Figure 1:
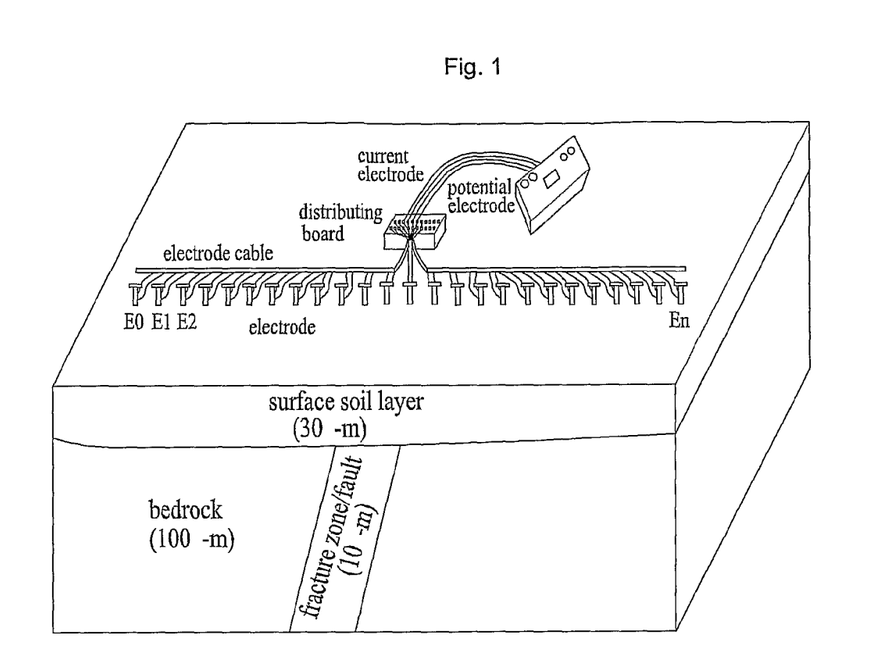
FIG. 1 illustrates field measurement according to an electrical resistivity survey.

FIG. 1 is a view for explaining field measurement using an electrical resistivity surveying method capable of non-destructively imaging a subsurface on the basis of difference in subsurface electrical conductivity in the case that the subsurface electrical conductivity is differently distributed according to geological features.

Specific resistance is reciprocal quantity of electrical conductance that is a measure of how easily electricity flows, and has a unit of ohm-meter, symbol Ω-m. As a result of such an electrical survey, if a part corresponding to low specific resistance appears in a cross-section of the imaged structure, it is generally determined as a mineral vein or a water vein. Further, in case of a site investigation or the like performed before tunnel excavation under recent civil engineering construction, such a part corresponding to the low specific resistance refers to a weak zone such as a fracture zone or a fault, etc., which has to be avoided or of which a counterplan has to be considered previously.

Besides, the electrical resistivity survey has recently been applied to not only a survey of an environment pollution zone in a landfill or an oil-leak place, but also an archaeological investigation.

An electrical resistivity survey system includes a transmitter, a receiver, a digital controller, a power supply, measuring software, etc. Additionally, for automatic measurement, the electrical resistivity survey includes a multi-channel relay based on digital output, a control circuit for a distributing board, and wiring.

Figure 2:
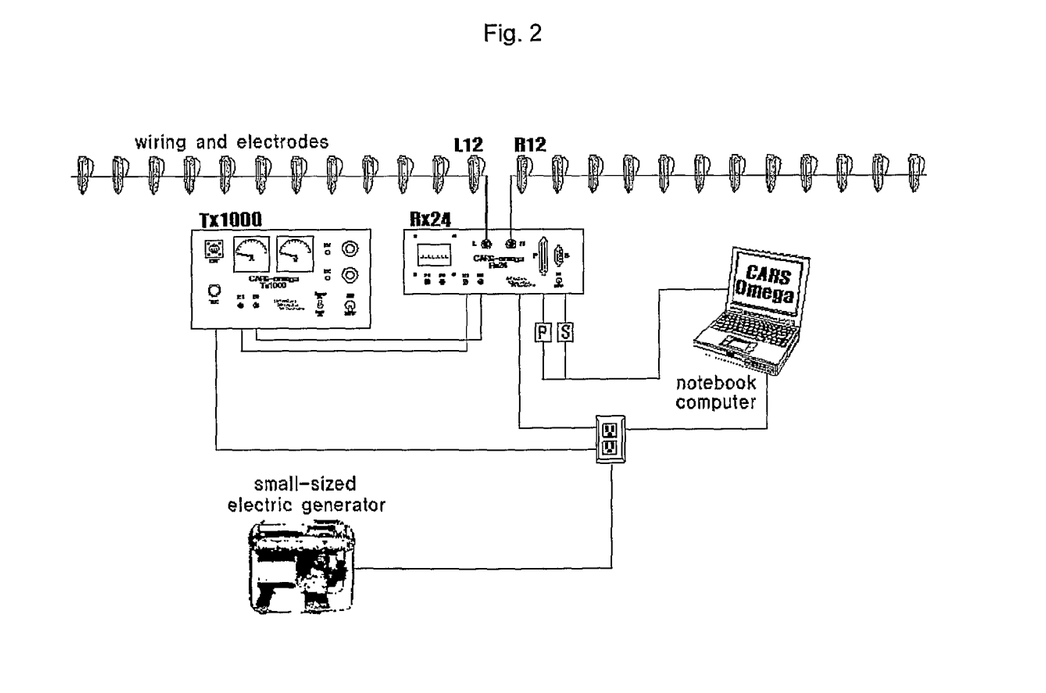
FIG. 2 illustrates an example of a conventional measuring system for the electrical resistivity survey.

FIG. 2 illustrates an example of a measuring system for the electrical resistivity survey.

In the receiver, receiving electrodes P1, P2 measure potential difference changed while an electric current flows from the transmitter between current electrodes C1, C2 through an underground medium. Then, an analog-to-digital (A/D) converter converts the potential difference to a digital signal as its gain is controlled. The digital signal is transmitted to a control/measurement notebook personal computer (PC) through a serial communication line.

At first thought, it may be regarded that such an electrical survey apparatus, which measures voltage by flowing the electric current in the subsurface while moving on the Earth's surface and finds a part where electricity easily flows, is one of electronic devices consisting of common electronic components. However, without design based on right theory and practical experience, it is not easy to make the surveying apparatus that will be satisfactorily usable in various fields.

The electrical resistivity survey has an electrode configuration such as a pole-pole array, a dipole-dipole array, a Wenner array, a Schlumberger array, etc. Every electrode configuration has advantages and disadvantages. Therefore, the best way is to compare the surveys performed with various electrode configurations on the same measuring line and complement the advantages and disadvantages of the electrode configurations.

However, it is difficult to practically apply various methods in consideration of time, economical efficiency or field conditions. Thus, there is a need of selecting an optimum electrode configuration according to objects, scales and field conditions of the survey.

As one of the geophysical surveys, a testing method and a principle of the electrical resistivity survey are as follows: the potential difference due to resistivity anomaly existing in the subsurface medium is measured and analyzed, and thus a subsurface structure such as a geological structure, a fault or a fracture zone, groundwater, etc. is examined.

In the measuring system for the electrical resistivity survey, the electrodes are selected one pair by one pair among several tens of electrodes and then the transmission and the measurement are performed. Recently, such a series of manual measurement has been automated by a relay configuration under software control.

In this case, use of the relay is limited to hundreds of thousands of electric contacts, so that the durability of the relay is not permanent. Further, the relay may easily break due to malfunction. Also, the relay becomes larger as the transmitting current capacity increases.

Particularly, if a relay controller is suddenly turned off while applying high voltage to an output-side load, mechanical contact points of the relay are largely damaged. This should be considered in designing the electrical survey because it often happens to the electrical survey that is an outdoor survey employing a rechargeable battery. To make provision against the foregoing damage, the relay may have a sufficiently large capacity. However, this case not only increases the size and weight of the relay, but also increases a unit cost and a driving power thereof. Further, the relay in this case still has a mechanical limit to electric contact, so that the problem of impermanent durability cannot be solved. In other words, the relay is not permanent because the use of the relay is limited to hundreds of thousands of electric contacts. Actually, the relay for the electrical survey operates to have one electric contact per second, so that the operation of the relay exceeds a million electric contacts for just several months. Thus, the relay is often used up.

Besides, the relay has problems of low speed, a contact noise owing to arc generation, a surge noise due to inductive load, mechanical wear, bounce chattering, etc.

Accordingly, if there is something that employs a configuration of a semiconductor (MOSFET or the like) to replace the relay for automatically controlling the electrode configuration, it will be used as a very stable and semipermanent apparatus. However, at present, there is no existing apparatus which applies the configuration of the semiconductor.

DISCLOSURE

Technical Problem

To solve the foregoing problems, an aspect of the present invention is to provide a stable and semipermanent apparatus for automatic control of current electrodes, which is capable of bipolar high-speed switching.

Technical Solution

An aspect of the present invention may be achieved by providing an apparatus for automatic control of current electrodes in a measuring system for an electrical resistivity survey, the apparatus including: a circuit where one pair of MOSFETs (metal oxide semiconductor field effect transistors) are connected to upper and lower terminals of n current electrodes and the one pair of MOSFETs are connected in parallel with each other; and a controller which controls ON/OFF of each MOSFET.

The controller may include two decoders, and the two decoders may be connected to the upper MOSFETs and the lower MOSFETs, respectively, and controls the ON/OFF of each MOSFET.

Thus, the present invention replaces a relay configuration of a conventional automatic control apparatus by a circuit structure in which a pair of MOSFETs are connected in parallel, thereby providing a stable and semipermanent apparatus for automatic control of current electrodes, which is capable of bipolar high-speed switching.

The controller may include a ground isolation unit to isolate a ground of each MOSFET, and stably control the ON/OFF of each MOSFET. The ground isolation unit may include a photocoupler connected to each MOSFET. In other words, a high voltage of several hundreds of volts is applied while the controller controls the ON/OFF of each MOSFET, so that the ground isolation unit isolated from the ground is employed for stably controlling the ON/OFF of each MOSFET.

The controller may include a protection circuit to break an output from the controller if the same current electrode is selected under the automatic control. For example, the protection circuit may include a decoder and a comparator connected to the decoder. The comparator may compare control data for the upper MOSFET and data for the lower MOSFET, and the output from the decoder may be cut off if both data are the same.

Thus, the present invention includes the protection circuit to logically keep away ON-control when selecting the same electrode, thereby preventing the MOSFET from being damaged due to malfunction.

Another aspect of the present invention may be achieved by providing a method for automatic control of current electrodes in a measuring system for an electrical resistivity survey, the method including: (a) by a controller, selecting two current electrodes C1, C2 from a circuit where one pair of MOSFETs are connected to upper and lower terminals of n current electrodes and the one pair of MOSFETs are connected in parallel with each other; (b) by the controller, controlling the upper MOSFET of the current electrode C1 and the lower MOSFET of the current electrode C2 to be ON and standing by for a predetermined period of time; (c) by the controller, controlling the upper MOSFET of the current electrode C1 and the lower MOSFET of the current electrode C2 to be OFF and standing by for a predetermined period of time; (d) by the controller, controlling the lower MOSFET of the current electrode C1 and the upper MOSFET of the current electrode C2 to be ON and standing by for a predetermined period of time; and (e) by the controller, controlling the lower MOSFET of the current electrode C1 and the upper MOSFET of the current electrode C2 to be OFF and standing by for a predetermined period of time.

Thus, on the basis of the H-bridge structure where one pair of MOSFETs are connected in parallel, the upper and lower MOSFETs connected to one pair of selected current electrodes are alternately controlled to be ON, so that the forward and backward currents are alternately applied to the current electrode, which is called a bipolar control, thereby making the electrical resistivity survey be stable and reliable.

The operation (a) may further include: (a-1) comparing control data for the upper MOSFET and control data for the lower MOSFET; and (a-2) breaking an output from the controller if the control data for the upper MOSFET is the same as the control data for the lower MOSFET. Therefore, the MOSFET devices can be prevented from damage even though the same electrode is selected due to malfunction.

Advantageous Effects

According to the present invention, a stable and semipermanent apparatus for automatic control of current electrodes, which is capable of bipolar high-speed switching, and a method thereof are provided to thereby solve the problems of a conventional relay-type apparatus.

Further, according to the present invention, an apparatus for automatic control of current electrodes includes a ground isolation unit for isolating a ground of each MOSFET so as to stably control ON/OFF of each MOSFET, and a protection circuit to logically keep away ON-control when selecting the same electrode so as to prevent the MOSFET from being damaged due to malfunction.

BEST MODE

Below, an apparatus and a method for automatic control of current electrodes for an electrical resistivity survey according to an exemplary embodiment of the present invention will be described in more detail with reference to accompanying drawings.

The present invention may, however, be embodied in different forms and should not be construed as limited to the embodiments set forth herein. Rather, these embodiments are provided so that this disclosure will be through and complete, and will fully convey the scope of the invention to those skilled in the art.

Figure 3:
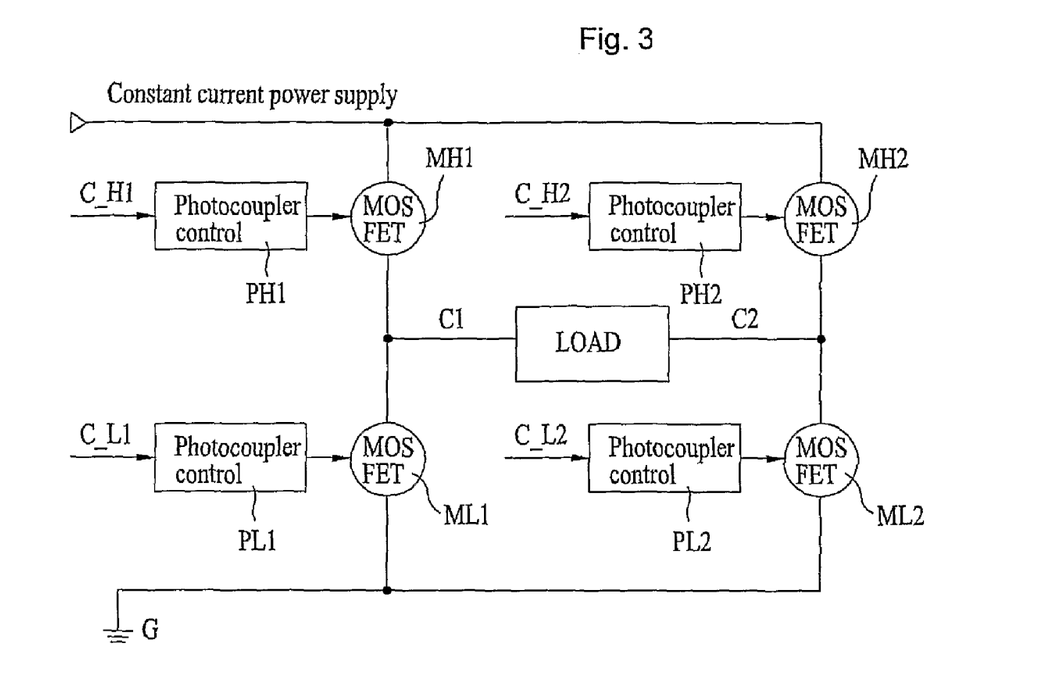
FIG. 3 is an H-bridge diagram of bipolar control for alternately applying forward and backward currents to a pair of selected current electrodes C1, C2 in a MOSFET configuration of an apparatus for automatic control of current electrodes according to an exemplary embodiment of the present invention.
Figure 4:
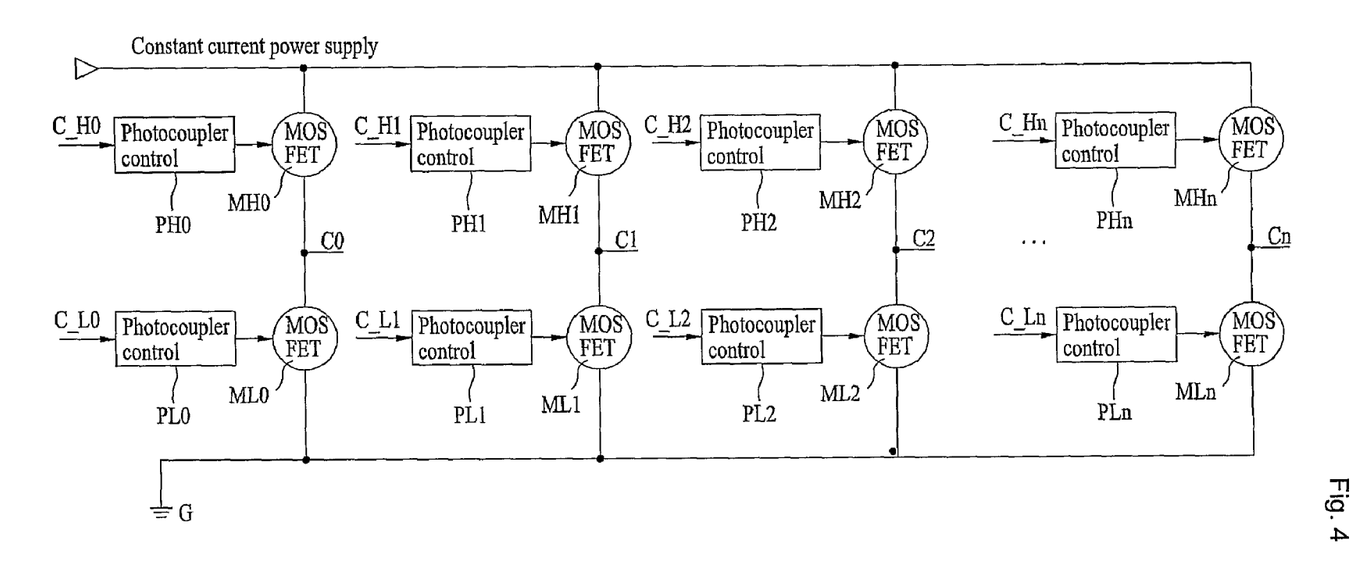
FIG. 4 is a basic circuit diagram of the apparatus for the automatic control of the current electrodes according to an exemplary embodiment of the present invention.

FIG. 3 is an H-bridge diagram of bipolar control for alternately applying forward and backward currents to a pair of selected current electrodes C1, C2 in a MOSFET configuration of an apparatus for automatic control of current electrodes according to an exemplary embodiment of the present invention, and FIG. 4 is a basic circuit diagram of the apparatus for the automatic control of the current electrodes according to an exemplary embodiment of the present invention.

As shown in FIG. 4, the apparatus for the automatic control of the current electrodes includes pairs of metal oxide semiconductor field effect transistors (MOSFETs) MH0, ML0, ..., MHn, MLn which are connected to upper and lower terminals of n current electrodes C0, C1, ..., Cn, respectively. Each pair of MOSFETs MH0, ML0, ..., MHn, MLn is connected with each other in parallel. Further, the apparatus for the automatic control of the current electrodes includes a controller (not shown) to control ON/OFF of each MOSFET.

Thus, the apparatus for the automatic control of the current electrodes according to an exemplary embodiment of the present invention is achieved by replacing a relay configuration of a conventional automatic control apparatus by a circuit structure in which a pair of MOSFETs is connected in parallel. The MOSFET makes high-speed switching possible and generates low heat with low internal resistance when flowing electric current therein. As compared with the conventional apparatus employing the relay configuration, the present apparatus for the automatic control of the current electrodes is very stable and semipermanently usable. In particular, the present apparatus can solve the problem of limited durability which even the large-capacity relay has.

The basic circuit according to an exemplary embodiment of the present invention has an H-bridge structure for controlling bipolar transmission that alternately applies forward and backward currents to a pair of selected current electrodes (refer to FIG. 3).

As shown in FIG. 3, one pair of MOSFETs MH1, ML1 are connected to the upper and lower terminals of the current electrode C1, and likewise one pair of MOSFETs MH2, ML2 are connected to the upper and lower terminals of the current electrode C2. Further, the MOSFETs MH1, ML1 are connected in parallel with the MOSFETs MH2, ML2, thereby forming the H-bridge structure along with the current electrodes C1, C2. When the upper MOSFET MH1 of the current electrode C1 and the lower MOSFET ML2 of the current electrode C2 are ON, the forward current is transmitted. On the other hand, when the lower MOSFET ML1 of the current electrode C1 and the upper MOSFET MH2 of the current electrode C2 are ON, the backward current is transmitted.

While the controller controls the ON/OFF of each MOSFET, a high voltage of several hundreds of volts is applied. According to an exemplary embodiment of the present invention, a ground isolation unit is provided for isolating a ground of each MOSFET, thereby stably controlling the ON/OFF of each MOSFET.

As an example of the ground isolation unit, a photocoupler PH0, PH1, ..., PHn, PL0, PL1, ..., PLn may be connected to each MOSFET. The photocoupler generates no noise because it uses light, and is capable of insulation between devices constituting the system so that the ground of each device is possible. Further, connection capacity between the devices is advantageously so small that a signal from an output side does not go back to an input side, and so on. As the photocoupler is connected to each MOSFET as a medium, the ground of the MOSFET is isolated and thus stable ON/OFF is possible.

Figure 5:
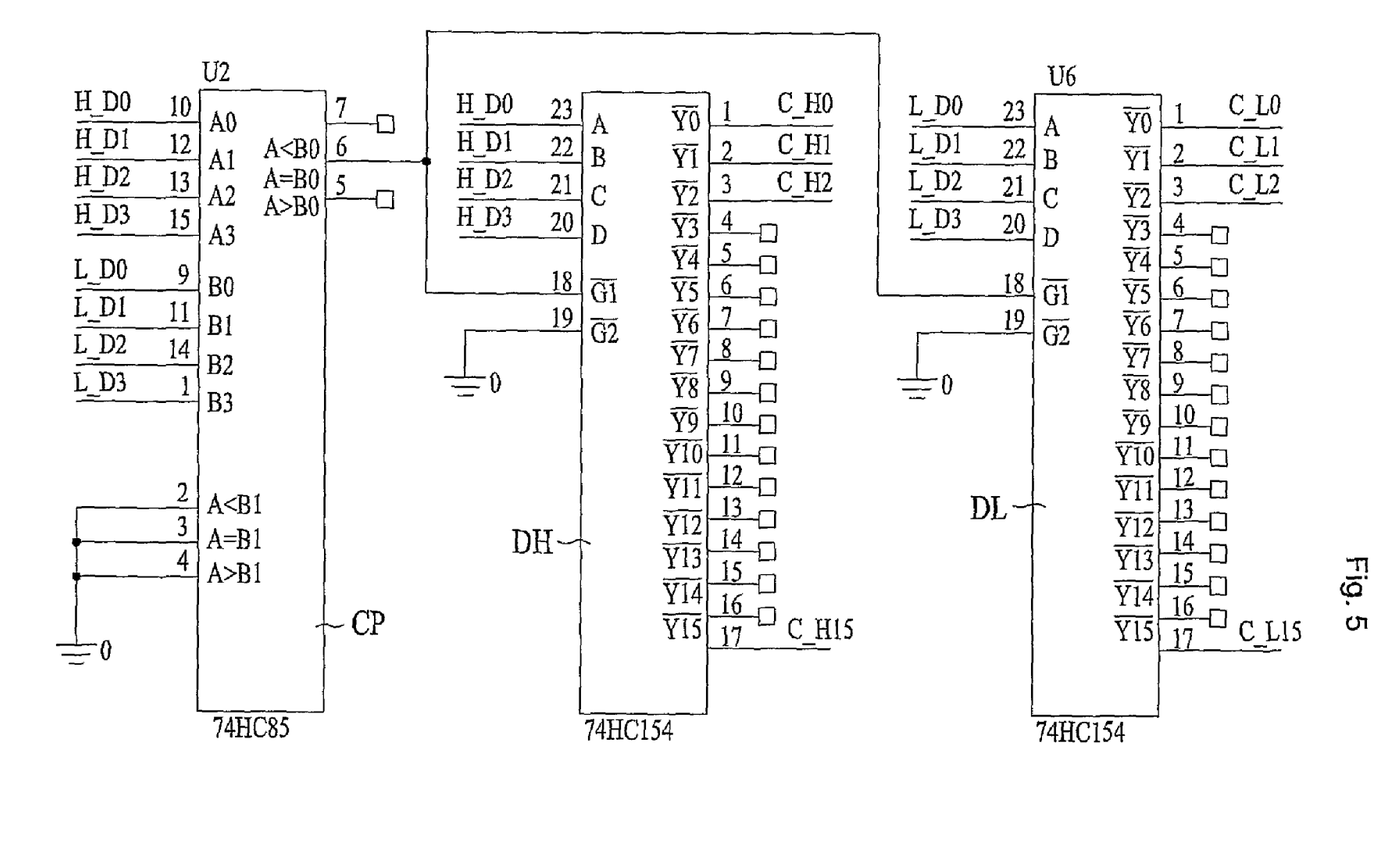
FIG. 5 shows a digital control circuit of the apparatus for the automatic control of the current electrodes according to an exemplary embodiment of the present invention.

FIG. 5 shows a digital control circuit of the apparatus for the automatic control of the current electrodes according to an exemplary embodiment of the present invention.

As shown in FIG. 5, two decoders DH, DL may be used as the controller. One decoder DH controls ON/OFF of the upper MOSFETs MH0, MH1, ..., MHn, and the other decoder DL controls ON/OFF of the lower MOSFETs ML0, ML1, ..., MLn.

In this embodiment, a 16-bit quaternary decoder integrated chip (IC) is shown corresponding to sixteen current electrodes (i.e., n=16). In a survey field, the number (n) of current electrodes, provided at regular intervals, may increase to 16, 32, 48, 68 and so on according to a necessary extension of a survey line. In the case that the number (n) of current electrodes increases, the basic circuit (for n=16) may be added as many as a needed multiple.

Meanwhile, if the controller selects the same current electrode due to its malfunction, outputs are short-circuited and the MOSFETs are damaged, thereby having trouble with the apparatus. In this case, an operator of the survey apparatus has to withdraw from the survey field and fix it up.

To solve such a problem, the controller according to an exemplary embodiment of the present invention includes a protection circuit to prevent output from the controller when the same electrode is selected under the automatic control.

According to an exemplary embodiment of the present invention, as shown in FIG. 5, the protection circuit includes two decoders DH, DL and a comparator CP connected to both decoders DH, DL. To control and protect sixteen current electrodes, the comparator CP is in need of one 4-bit comparator IC, and two decoders DH, DL are in need of 16-bit quaternary decoder IC.

Further, a system controller may employ a one-chip microprocessor or an industrial embedded central processing unit (CPU) board. At this time, the system controller needs 8-bit digital output lines. Four outputs from the 8-bit digital output lines are assigned to H_D0, H_D1, H_D2 and H_D3, and input to one decoder IC, so that one (e.g., C_H1) is selected among sixteen to thereby make the upper MOSFET (refer to FIG. 4) ON. The other four outputs from the 8-bit digital output lines are assigned to L_D0, L_D1, L_D2 and L_D3, and input to the other one decoder IC, so that one (e.g., C_L1) is selected again among sixteen to thereby make the lower MOSFET (refer to FIG. 4) ON.

However, if two selected electrodes are the same due to error, the upper and lower MOSFETs for controlling the same electrode are ON at the same time and short-circuited while instantly generating heat. The instant heat generation damages the devices. Actually, such an accident often happens in the survey fields. To protect the devices from this damage, the output of the decoder IC may be cut off in the case that the upper and lower MOSFETs of the same electrode are ON at the same time.

For this, an additional 4-bit comparator IC is used. For example, 4-bit input data H_D0, H_D1, H_D2 and H_D3 for controlling the upper side and 4-bit input data L_D0, L_D1, L_D2 and L_D3 for controlling the lower side are intercepted from the comparator IC and compared. If the upper and lower 4-bit input data are the same, the output from the comparator IC is sent to two decoder ICs as logic input, thereby breaking the output from each decoder IC. Then, if the upper and lower 4-bit data are different in even 1-bit, normal control for the decoder IC is resumed.

According to an exemplary embodiment of the present invention, the protection circuit logically keeps away the ON-control when the same electrode is selected, so that the MOSFET devices can be prevented from damage due to malfunction.

Below, a method for the automatic control of current electrodes will be described according to an exemplary embodiment of the present invention.

In the electrical resistivity survey, a direct current flows alternately forward and backward through a pair of electrodes, thereby measuring electric potential. If the direct current for the survey flows in only one direction, electric potential naturally existing under the Earth's surface is added to or subtracted from the direct current, so that it is difficult to get accurate measurements. Therefore, transmitting results of the forward and backward currents are summed to calculate the electric potential excluding the natural electric potential. In the present embodiment, the forward and backward currents are alternately transmitted as follows.

Figure 6:
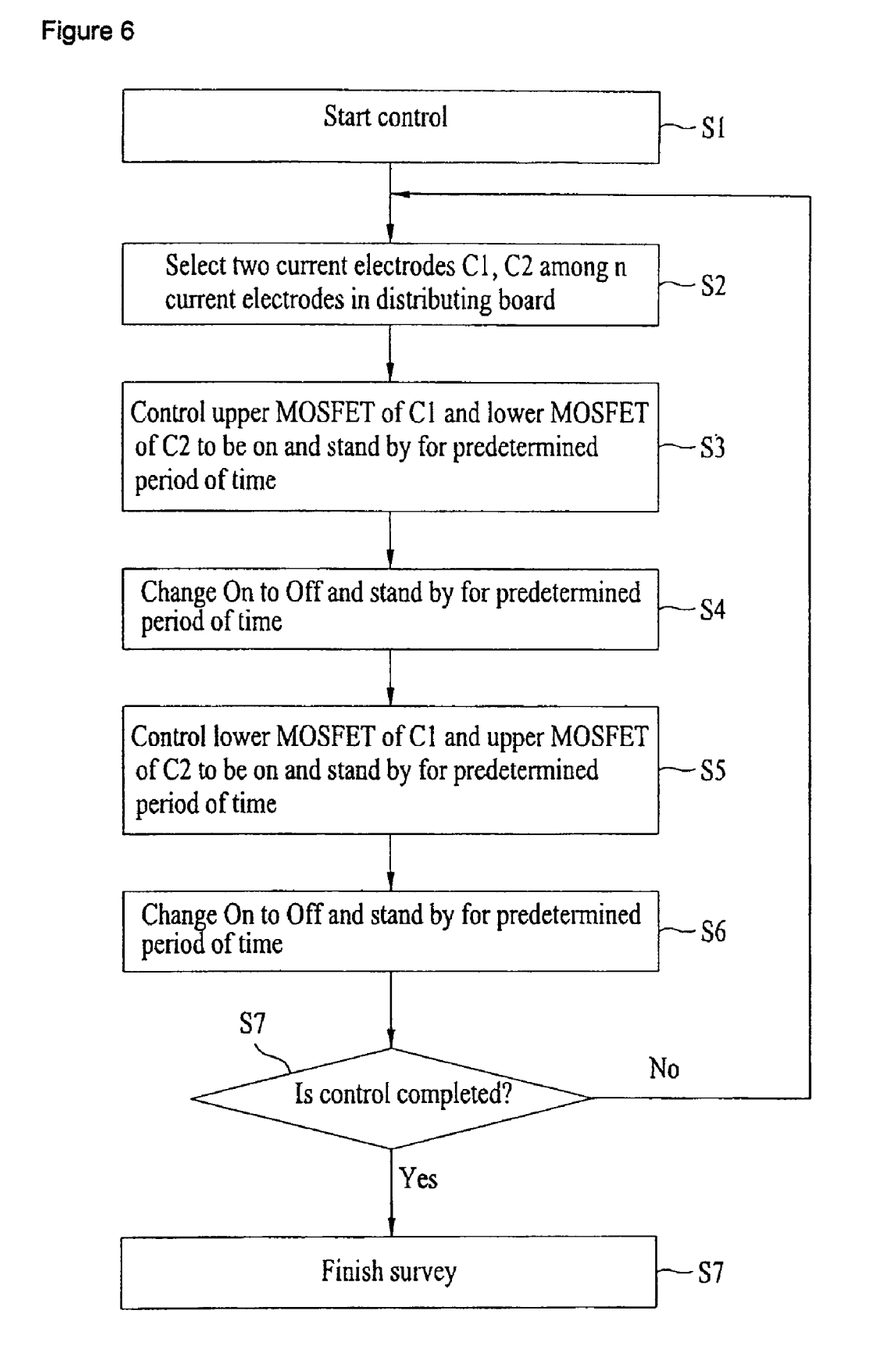
FIG. 6 is a flowchart of a method for the automatic control of the current electrodes according to an exemplary embodiment of the present invention.

FIG. 6 is a flowchart of a method for the automatic control of the current electrodes according to an exemplary embodiment of the present invention.

As shown in FIG. 6, the method for the automatic control of the current electrodes is achieved by bipolar transmission control in the apparatus for the automatic control of the current electrodes, in which the pair of MOSFETs are connected in parallel with the upper and lower terminals of n current electrodes.

First, the controller (a) selects two current electrodes C1, C2 at operation S2, and (b) controls the upper MOSFET of the current electrode C1 and the lower MOSFET of the current electrode C2 to be ON (i.e., flowing the forward current) and stands by for a predetermined period of time at operation S3. Thus, the electric potential is measured by the forward current.

Then, the controller (c) controls the upper MOSFET of the current electrode C1 and the lower MOSFET of the current electrode C2 to be OFF and stands by for a predetermined period of time at operation S4.

Then, the controller (d) controls the lower MOSFET of the current electrode C1 and the upper MOSFET of the current electrode C2 to be ON (i.e., flowing the backward current) and stands by for a predetermined period of time at operation S5. Thus, the electric potential is measured by the backward current.

Then, the controller (e) controls the lower MOSFET of the current electrode C1 and the upper MOSFET of the current electrode C2 to be OFF and stands by for a predetermined period of time at operation S6.

The foregoing operations (a) to (e) are repeated until the survey is completed. Further, if a new pair of current electrodes is selected by the controller, the operations (a) to (e) are performed again.

As described above, according to an exemplary embodiment of the present invention, on the basis of the H-bridge structure where one pair of MOSFETs are connected in parallel, the upper and lower MOSFETs connected to one pair of selected current electrodes are alternately controlled to be ON, so that the forward and backward currents are alternately applied to the current electrode, thereby making the electrical resistivity survey be stable and reliable.

Further, the operation (a) includes (a-1) comparing the data for controlling the upper MOSFET and the data for controlling the lower MOSFET; and (a-2) breaking the output from the controller if the data for controlling the upper MOSFET is the same as the data for controlling the lower MOSFET.

At the operation S2 where one pair of current electrodes is selected by the controller, if two selected electrodes are the same due to malfunction, there is a need of breaking a signal output from the controller so as to protect the devices. For this, it will be appreciated that the operation (a) includes the operations (a-1) and (a-2).

The operations (a-1) and (a-2) are performed by the above-mentioned protection circuit. For example, the controller includes a comparator connected to the decoder, and the comparator compares the input data for controlling the upper MOSFET and the input data for controlling the lower MOSFET. When both data are the same, the output from the comparator is sent as the logic input to the decoder, thereby breaking the output of the decoder.

According to an exemplary embodiment of the present invention, the controller previously compares the input data, and thus prevents the MOSFET devices from damage even though the same electrode is selected due to malfunction.

As described above, various exemplary embodiments have been described with the drawings and the specifications. For reference, terms employed herein are not used for narrowing the meaning and limiting the scope of the invention. Accordingly, it will be appreciated by those skilled in the art that changes may be made in these exemplary embodiments without departing from the principles and spirit of the invention, the scope of which is defined in the appended claims and their equivalents.

INDUSTRIAL APPLICABILITY

An apparatus and a method for automatic control of current electrodes according to the present invention can be widely used in an electrical resistivity survey.

The invention claimed is:

1. An apparatus for automatic control of current electrodes in a measuring system for an electrical resistivity survey, the apparatus comprising:
   a circuit where one pair of MOSFETs (metal oxide semiconductor field effect transistors) are connected to upper and lower terminals of n current electrodes that are connected to a substrate, and a plurality of pairs of MOSFETs are connected in parallel with each other; and
   a controller which controls ON/OFF of each MOSFET.

2. The apparatus according to claim 1, wherein
   the controller comprises two decoders, and
   the two decoders are connected to the upper MOSFETs and the lower MOSFETs, respectively, and controls the ON/OFF of each MOSFET.

3. The apparatus according to claim 1, wherein
   the controller comprises a ground isolation unit to isolate a ground of each MOSFET, and stably controls the ON/OFF of each MOSFET.

4. The apparatus according to claim 3, wherein
   the ground isolation unit comprises a photocoupler connected to each MOSFET.

5. The apparatus according to claim 1, wherein
   the controller comprises a protection circuit to break an output from the controller if the same current electrode is selected under the automatic control.

6. The apparatus according to claim 5, wherein
   the protection circuit comprises a decoder and a comparator connected to the decoder, and
   the comparator compares control data for the upper MOSFET and data for the lower MOSFET and the output from the decoder is cut off if both data are the same.

7. A method for automatic control of current electrodes in a measuring system for an electrical resistivity survey, the method comprising:
   (a) by a controller, selecting a first current electrode and a second current electrode from a circuit where one pair of MOSFETs are connected to upper and lower terminals of n current electrodes and a plurality of pairs of MOSFETs are connected in parallel with each other;
   (b) by the controller, controlling the upper MOSFET of the first current electrode and the lower MOSFET of the second current electrode to be ON and standing by for a predetermined period of time;
   (c) by the controller, controlling the upper MOSFET of the first current electrode and the lower MOSFET of the second current electrode to be OFF and standing by for a predetermined period of time;
   (d) by the controller, controlling the lower MOSFET of the first current electrode and the upper MOSFET of the second current electrode to be ON and standing by for a predetermined period of time; and
   (e) by the controller, controlling the lower MOSFET of the first current electrode and the upper MOSFET of the second current electrode to be OFF and standing by for a predetermined period of time.

8. The method according to claim 7, wherein the operation (a) comprises:
   (a-1) comparing control data for the upper MOSFET and control data for the lower MOSFET; and
   (a-2) breaking an output from the controller if the control data for the upper MOSFET is the same as the control data for the lower MOSFET.

* * * * *